Dec. 3, 1940.  E. C. HORTON  2,223,660
WINDSHIELD CLEANER
Filed Jan. 21, 1935  3 Sheets-Sheet 1

INVENTOR
Erwin C. Horton,
BY
Beau Brooks.
ATTORNEYS

Dec. 3, 1940.          E. C. HORTON          2,223,660
                       WINDSHIELD CLEANER
                     Filed Jan. 21, 1935         3 Sheets-Sheet 2
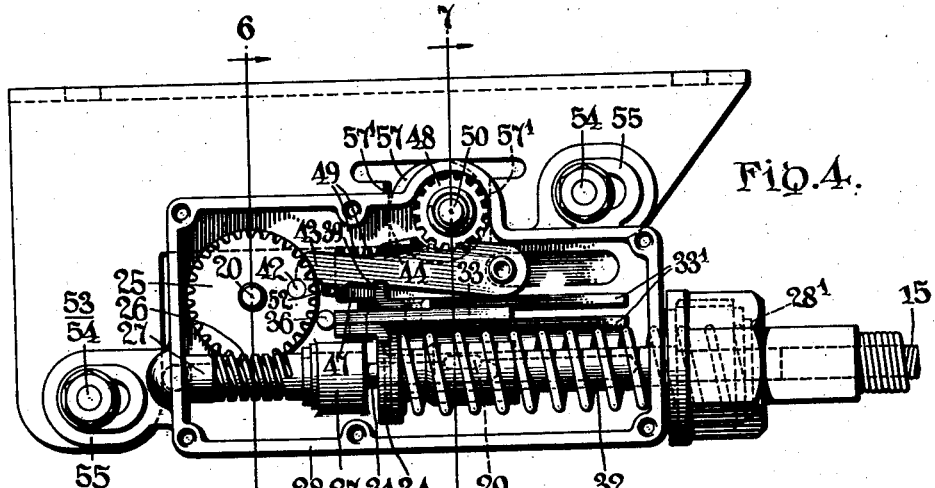
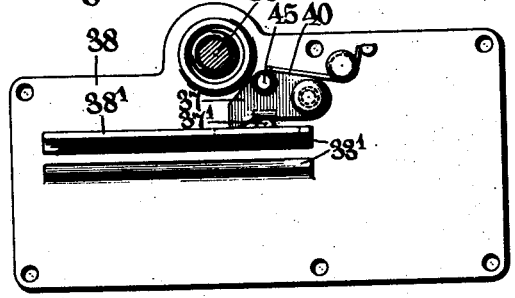
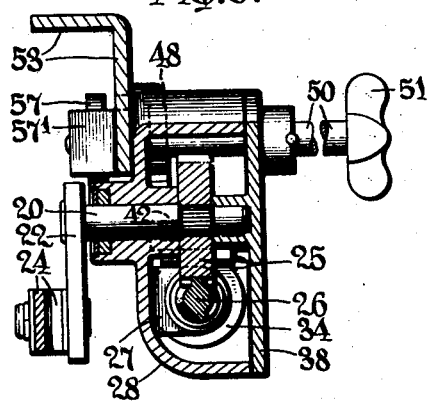  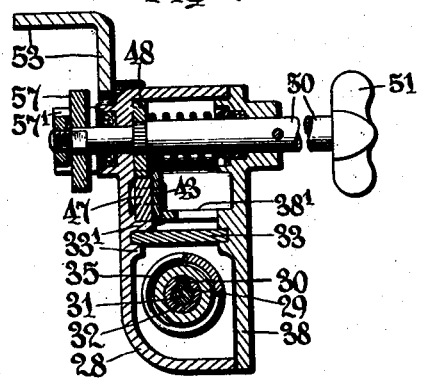
INVENTOR
Erwin C. Horton,
BY
Beau & Brooks
ATTORNEYS Dec. 3, 1940.   E. C. HORTON   2,223,660
WINDSHIELD CLEANER
Filed Jan. 21, 1935   3 Sheets-Sheet 3
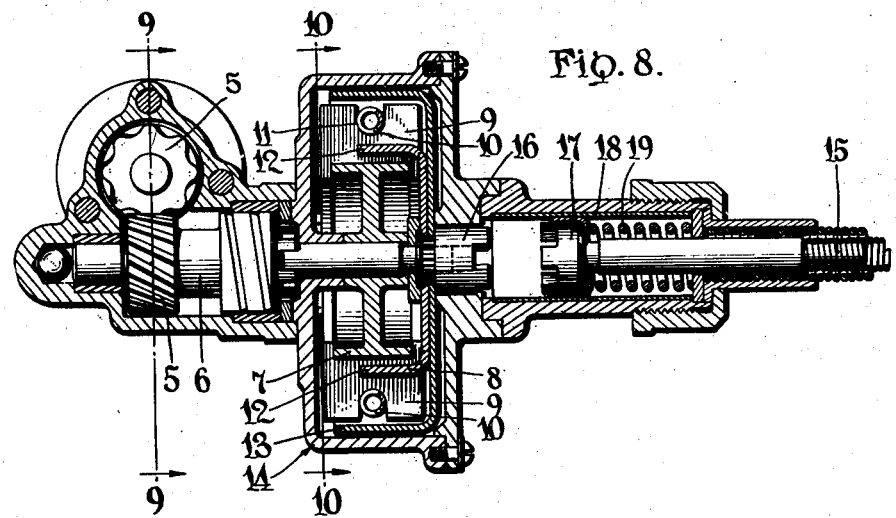
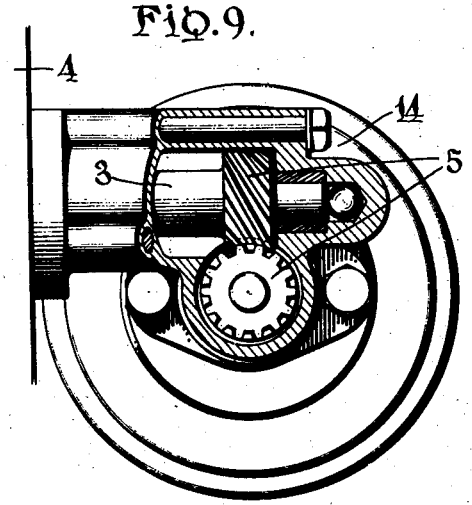
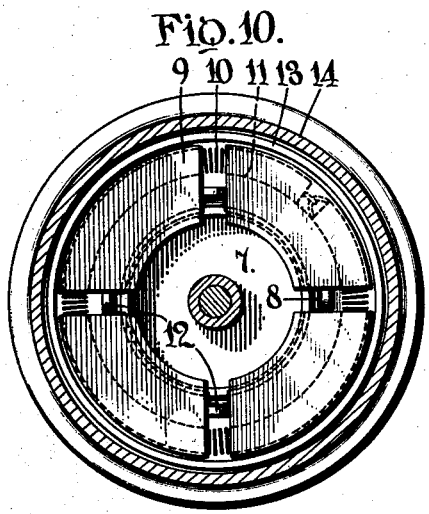
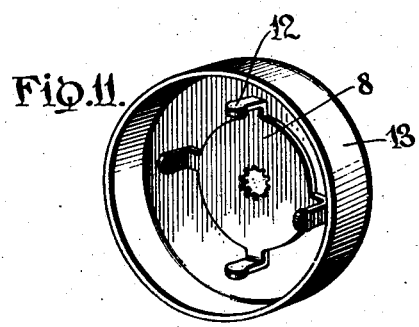
INVENTOR
Erwin C. Horton,
BY
Bean & Brooks
ATTORNEYS Patented Dec. 3, 1940

2,223,660

UNITED STATES PATENT OFFICE 2,223,660

WINDSHIELD CLEANER

Erwin C. Horton, Hamburg, N. Y., assignor to Trico Products Corporation, Buffalo, N. Y.

Application January 21, 1935, Serial No. 2,829

4 Claims. (Cl. 15—255)

This invention relates to motor vehicles, and particularly to windshield cleaners therefor which are driven from a moving part thereof, such as the drive or cam shafts of the vehicle power plant.

It has been proposed to operate windshield cleaners from a moving part of the vehicle and to connect the wiper element with the remote source of power through a clutch mechanism so that when it becomes necessary to discontinue the use of the wiper element, the clutch may be operated to interrupt the transmission of power. In constructions heretofore designed, not only has it been necessary for the motorist to approximate where the wiper element will come to rest, but also the wiper element has been driven at a variable speed in correspondence with the speed of the driving part of the vehicle.

It is desirable to bring the wiper element to rest outside of the field of vision through the windshield which is cleaned by the wiper element, but no provision has heretofore been made to so arrest or park the wiper in this particular type of windshield cleaner. Consequently the motorist is often inconvenienced or annoyed by the presence of the wiper directly across his field of vision, and in attempting to park it to one side by more or less uncertain means his attention is distracted from the safe manipulation of the vehicle.

The present invention has for its object to provide a windshield cleaner in which the wiper is operated from a remote source of power and may readily be connected and disconnected therefrom, all in an efficient and practical manner. Further, the aim of the invention is to provide a wiper which may be automatically parked to one side of the field of vision, thus providing a windshield cleaner which is practical, efficient and advantageous in design and operation.

In the drawings:

Fig. 4 is a view of the windshield cleaner mounting bracket and parking mechanism with portions removed and depicting the parts in parked relation and as viewed from the opposite side from Fig. 2;

Fig. 5 is a similar view of the portions removed from Fig. 4;

Fig. 6 is a transverse section about on line 6—6 of Fig. 4;

Fig. 7 is a similar view about on line 7—7 of Fig. 4;

Fig. 8 is a sectional view through the clutch and speed controlling mechanism which is preferably disposed at the point of power take-off from the moving part of the vehicle;

Fig. 9 is a transverse sectional view about on line 9—9 of Fig. 8;

Fig. 10 is a similar view about on line 10—10 of Fig. 8;

Fig. 11 is a perspective view of a detail of the clutch element.

Figure 1:
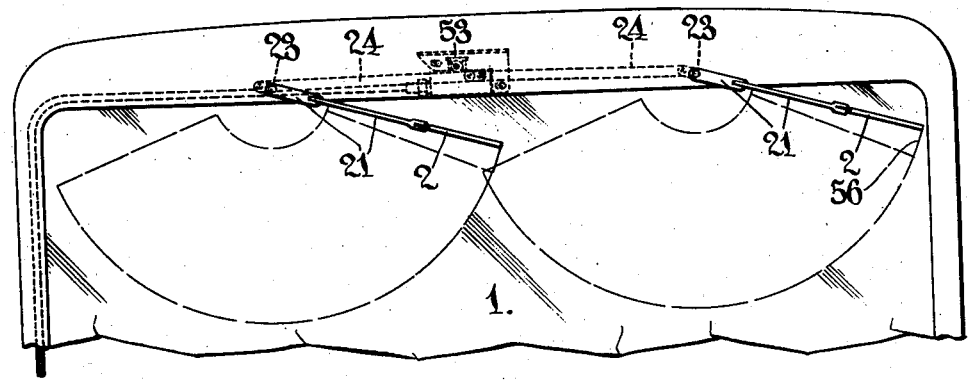
Fig. 1 is a view illustrating a windshield equipped with the improved windshield cleaner.

Referring more particularly to the drawings, the numeral 1 designates the window or windshield over which the wiper or blade element 2 is reciprocated through a power transmission taking off from a moving part of the vehicle, such as the rotatable shaft 3 of the engine 4. The power take-off unit, according to the present disclosure, comprises intermeshing worm gears 5 which operatively connect the driving shaft 3 to an intermediate shaft 6.

Incorporated by preference in this power take-off unit is a speed governing device which may comprise a driving clutch member 7, a driven clutch member 8 and connecting clutch shoes 9 which are mounted about the periphery of member 7 and held in yielding frictional contact therewith by an encircling resilient member 10. The shoes may have peripheral grooves 11 to confine the resilient member, while the driven clutch member 8 has fingers 12 extending between adjacent clutch shoes so as to be driven thereby. When rotating above a predetermined speed, the clutch shoes 9 are activated by centrifugal force to move outwardly against the urge of the resilient binder member 10. This permits the driving member 7 to slip within the embrace of the clutch shoes until such time as the rotative speed is reduced sufficiently to enable the resilient binder 10 to function again in its normal capacity. Consequently, the driven member 8 will have a maintained speed below that of the driving member when the latter exceeds a predetermined speed by reason of the slippage of said driving member within the clutch shoes. A housing 13 may be provided to rotate with the driven member 8 and enclose the friction shoes in a manner to restrict their outward throw and prevent their contact with the stationary clutch casing 14.

The driven clutch member 8 is connected to a flexible drive shaft 15 through separable connector parts 16 and 17, connector part 16 being joined to the driven member 8 while connector part 17 is fixed to the adjacent end of the flexible shaft. Connector part 17 is slidably guided within the housing 18 and is urged toward the driving connector part 16 by a coil spring 19, so that when the flexible shaft 15 is free to be moved by the spring 19, the latter will urge connector part 17 into cooperative engagement with the connector part 16. By reason of the associated speed governing clutch, the driving connector part will have a definite maximum speed and therefore ready connection by the shiftable connector part may easily be established without danger of breaking or injuring the mechanism. The vehicle engine may be operating at an excessive speed but by reason of the governor function the connector parts will be readily engaged and disengaged, being easily engaged by the pressure of the light spring 19 in an efficient manner. Furthermore, this uniformity of wiper speed will insure exactness of parking the wiper and avoid the latter overrunning its parked position.

The opposite end of the flexible shaft leads up to the wiper which is mounted adjacent the window surface to be cleaned and is operatively connected to the wiper actuating shaft 20. This shaft is provided with a crank arm 22 which is connected to one or more wiper moving arms 21, the latter being carried by the stub shafts 23 and operated from shaft 20 by connecting links 24. Fixed on the shaft 20 is gear 25 having driving mesh with a worm 26 which is supported in fixed journal bearings 27 of a transmission housing 28. The worm is connected to the flexible shaft 15 by a play connection shown as consisting of a spline 29 slidably operating in the groove 30 provided respectively in the telescopically related shaft parts 31 and 32, the flexible shaft 15 being connected to the latter part. This play connection permits the flexible shaft to be shifted axially in opposite directions for connecting or disconnecting the separable connector parts 16 and 17. Consequently, the transmission of power between the power take-off unit and the wiper is accordingly established or broken.

In order to break the driving connection at a definite time, whereby the wiper will be parked to one side of the field of vision and thus in a position which will not obstruct the clear view of the motorist, means are provided for automatically disengaging connector part 17 from its companion part 16. According to the present disclosure, this parking arrangement includes a slide member 33 which is movably mounted in guides 33' on opposed walls of the transmission housing 28 and is provided with a yoke 34 freely straddling or receiving the non-shiftable shaft part 31. A coil spring 35 of greater strength than spring 19 surrounds the shiftable shaft part 32 and is compressed between a fixed abutment 28' (in the housing) and a ring 41. This ring is slidable on the shaft part 32, or an enlargement thereof, between spaced shoulders 32', the yoke 34 being freely slidable over the forward one of such shoulders so as to engage the ring 41 and shift it to compress the spring 35. By compressing this spring the flexible shaft is relieved of its tension and therefore the connector spring 19 may come into play and urge connector part 17 into operative engagement with its companion part 16. When the spring 35 is free to act, it will pull the flexible shaft 15 against the urge of the spring 19 and separate connector part 17 from its drive.

Figure 2:
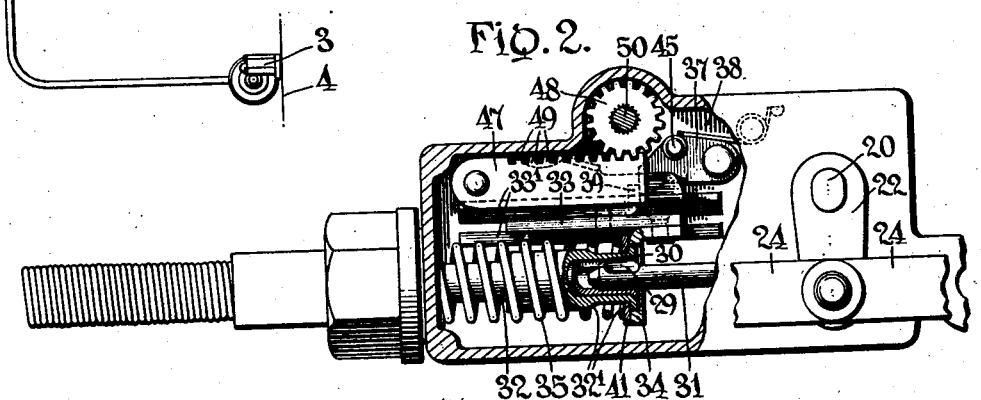
Fig. 2 is a fragmentary showing of the cleaner mechanism in wiper operating relation.

When the windshield cleaner is in operation, parking member 33 is held in a position to compress the spring 35 and thus release the spring 19 to urge the part 17 into cooperative relationship with the connector part 16. To this end a latch 37, pivoted on the inside of the cover plate 38 and urged to its operative position by spring 40, engages behind a stop shoulder 39 on said parking member 33. This shoulder is free to pass beneath the latch 37 during spring compressing movement of the parking member following which the latch will drop behind the shoulder and secure the parking member against unauthorized return, as depicted in Fig. 2. The latch therefore serves to hold the spring 35 compressed and permits the establishment of the operative connection between the flexible shaft and its drive.

Figure 3:
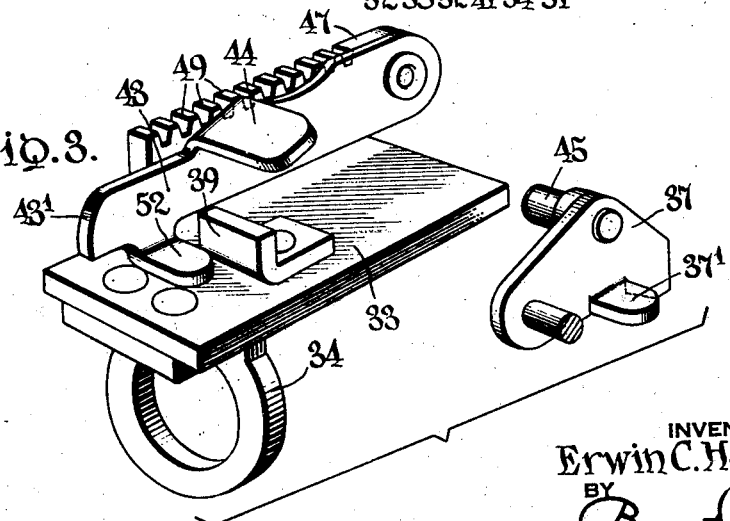
Fig. 3 is a perspective view of parts thereof disassembled.

To release the parking member 33 from its retaining latch 37, there is provided a trip pin 42 on a moving part of the cleaner mechanism, such as the gear 25. This pin is designed to act on the outer end of a release member 43 to lift the latch 37 from the path of shoulder 39 so as to permit the spring 35 to function in uncoupling shaft 15 from its drive. As the release member 43 is lifted a lug 44 carried thereby engages beneath a pin 45 on the latch to lift the latter from engagement with the shoulder 39. This release member is pivotally mounted on a slidable support 47 which is manually adjusted within the housing 28 by the meshing pinion 48 and rack 49, the latter being carried on said slidable support 47. Pinion 48 is fixed on shaft 50 which is provided with a handle 51, and when the handle is turned counter-clockwise, in Fig. 4, the sliding support 47 is moved towards the right carrying with it the release member 43 and causing its lug 52 to engage the shoulder 39, (Fig. 3) and therethrough shift the parking member 33 to the right sufficiently to remove the urge of spring 35 from the shaft 15, where it is secured by the latch 37. The lug 44 will merely ride under the pin 45 during this movement, the latch being normally supported in a rest position by a stop lug 37' on a part of the cover plate 38. The support 47 and its release member are guided between the wall of the housing and a ledge 38' projecting from the cover 38.

When it is desired to arrest the wiper and its mechanism, the handle 51 is turned in the opposite direction, or clockwise, in Fig. 4 to thereby move the support 47, and the release member 43, to the left independently of the parking member 33. This movement pre-sets the lug 44 beneath the latch pin 45 and the nose 43' of release member 43 in the path of trip pin 42 so that when the rotating trip pin comes against the release member 43, the latter will be lifted to raise the latch from behind the shoulder 39 and thus release the spring 35 for acting through the flexible shaft 15 to disengage the clutch member 17 from its drive. This will result in bringing the wiper to rest at a definite and predetermined position to one side of the field of vision or the surface area which has been cleaned by the wiper. The parking member will be arrested by a stop pin 36.

In some instances it may be desirable to park the wiper beyond the limit of its normal path of movement, and for this purpose the transmission housing 28 may be adjustably mounted on its mounting bracket 53, as by means of the guide pins or bolts 54 operating in the slotted ears 55, so that when the housing is shifted on these guide pins 54, the wipers will be shifted slightly beyond the normal path of movement as indicated at 56 in Fig. 1. This shifting of the housing 28 is effected, according to the present disclosure, by and during manipulation of the handle 51.

To this end an eccentric 57 is fixed on the shaft 50 and disposed in bearing contact with and between a pair of lugs 57' out-turned from the bracket 53. As the shaft is turned to shift the slidable support 47 in either direction the eccentric will accordingly slide the housing on its supporting pin 54. This movement, when stopping the cleaner operation, will shift the wiper actuating shaft 20 and, in turn, the path of wiper movement, whereby the wiper will become arrested at the end of its stroke beyond the path of normal operation. When it is desired to start the cleaner operation the shaft 50 is turned to shift the housing and wiper back to their normal operating positions and the parking member back to its spring compressing position, whereupon the connector spring 19 will function to make the required drive connection, such being facilitated by the governed speed of the driving connector part 16.

The exactness in parking the wiper is of utmost importance since the reciprocatory cleaner may be turned off regardless of the speed of the engine. Should the use of the cleaner be discontinued while the engine is operating at a high speed the controlled movement of the several moving parts of the cleaner avoids overrunning the parked position. Because of the governed speed the several parts which effect the parking operation may be so built and adjusted to such a nicety in functioning as to provide for the desired exactness and definiteness in the parking of the wiper regardless of the engine speed. This is by reason of the substantial uniformity in the speed of wiper operation which permits proper co-operation between the several parts in their timed order of sequence and devoid of extreme or abnormal movements tending to produce irregular and improper functioning. The parking operation is therefore carried out smoothly and reliably regardless of engine speed.

What is claimed is:

1. Mechanism of the class described, comprising a shaft, transmission means for connecting the shaft to a source of power and including separable driving and driven connector parts, means for governing the speed of the driving connector part against exceeding a predetermined maximum speed, resilient means urging the driven connector part from the driving connector part, means for relieving said driven connector part from the influence of said resilient means, and pre-set means operable by a moving portion of the transmission means to free said resilient means from said relieving means.

2. Mechanism of the class described, comprising a shaft, transmission means for connecting the shaft to a source of power and including separable driving and driven connector parts, means for governing the speed of the driving connector part against exceeding a predetermined maximum speed, resilient means urging the driven connector part from the driving connector part, means for moving said connector parts into cooperative relation when free from the urge of said resilient means, means for freeing the driven connector part from the urge of said resilient means, a latch for securing said freeing means operative, and pre-set means operable by said transmission means for rendering the latch inoperative.

3. Mechanism of the class described, comprising a shaft, transmission means for connecting the shaft to a source of power and including separable driving and driven connector parts, manually pre-set means releasable by said transmission means to effect disconnection of said connector parts, and means for shifting said shaft laterally by and during manual movement of said pre-set means.

4. Mechanism of the class described, comprising a shaft, transmission means for connecting the shaft to a source of power and including separable driving and driven connector parts, resilient means urging the driven connector part from the driving connector part, means for moving said connector parts into cooperative relation when free from the urge of said resilient means, means for freeing the driven connector part from the urge of said resilient means, a latch for securing said freeing means operative, pre-set means operable by and during operation of said transmission means to disengage the latch, and means operable by and during actuation of said pre-set means for shifting said shaft laterally to arrest the same outside the normal path of movement.

ERWIN C. HORTON.